No. 803,758. PATENTED NOV. 7, 1905.
W. F. HERDRICH.
COMBINED CIGAR CUTTER AND MATCH LIGHTER.
APPLICATION FILED APR. 1, 1905.
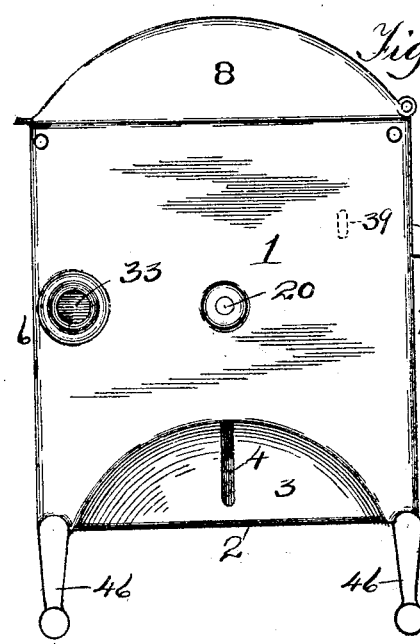
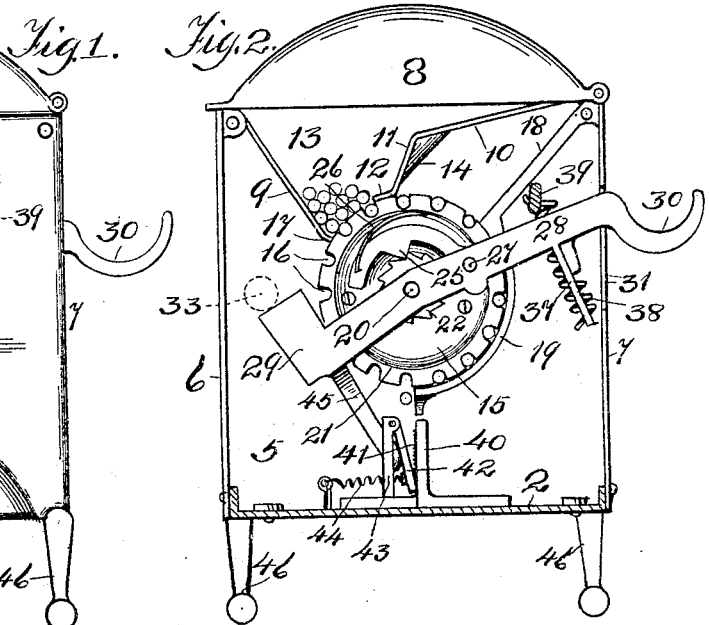
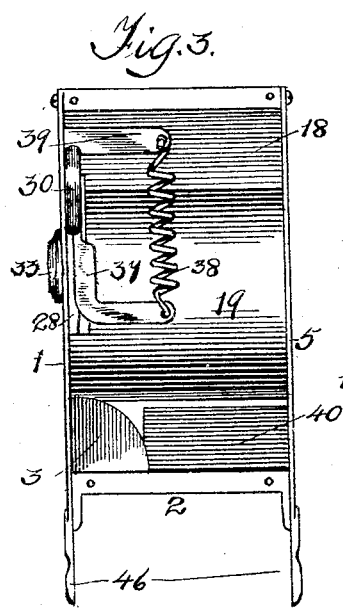
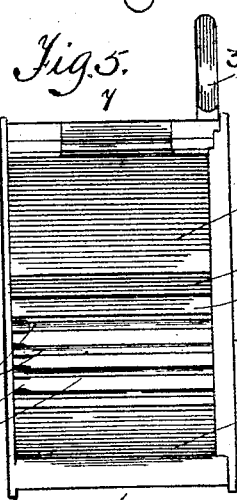
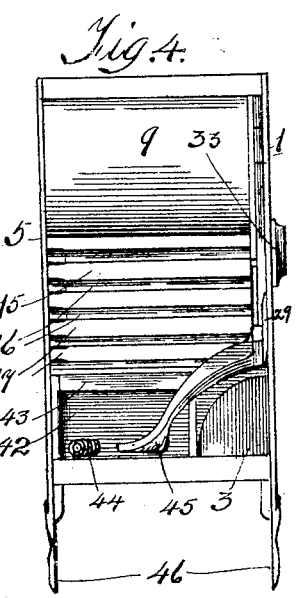
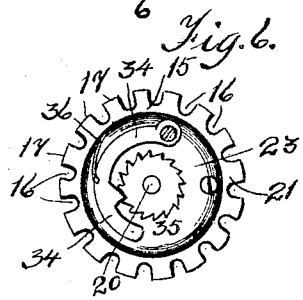
Witnesses:
Wm P. Bond
Oscar W. Bond
Inventor
William F. Herdrich
By Banning & Banning
Attys

UNITED STATES PATENT OFFICE.

WILLIAM F. HERDRICH, OF CHICAGO, ILLINOIS.

COMBINED CIGAR-CUTTER AND MATCH-LIGHTER.

No. 803,758.　　　　　Specification of Letters Patent.　　　　　Patented Nov. 7, 1905.

Application filed April 1, 1905. Serial No. 253,230.

*To all whom it may concern:*

Be it known that I, WILLIAM F. HERDRICH, a citizen of the United States, residing at Chicago, in the county of Cook and State of Illinois, have invented certain new and useful Improvements in a Combined Cigar-Cutter and Match-Lighter, of which the following is a specification.

This invention is intended more especially for use in advertising brands of cigars, and has for its object to provide means for simultaneously cutting the end of a cigar and supplying a match to the user, which match will be lighted by its withdrawal from the device, thereby supplying the match to the smoker ready to light the cut cigar.

The object of the invention is to improve and simplify the cigar-cutting and match-discharging mechanism so that the device may be filled with matches which will be automatically discharged by the movement of the mechanism which also cuts off the end of the cigar.

Another object of the invention is to improve the feed mechanism for the matches so that the matches will be properly discharged one at a time and to obviate the danger of clogging the discharger and preventing the operation of the mechanism.

The invention consists in the features of construction and combination of parts hereinafter described and claimed.

In the drawings illustrating the invention, Figure 1 is a front elevation of the device; Fig. 2, an interior view showing the front casing removed and the bottom sectioned; Fig. 3, an end elevation showing the side casing and cover removed; Fig. 4, a similar end elevation of the opposite end of the device; Fig. 5, a top or plan view with the cover removed, and Fig. 6 a view of the rear end of the discharging-cylinder.

The device is constructed to have an outer casing consisting of a front plate 1 having formed integral therewith a bottom plate 2, and the lower front edge of the casing is inwardly rounded to form a concavity 3, provided with a vertical wall 4, through which the matches are discharged. The casing is provided with a plain back plate 5 and end plates 6 and 7, to the latter of which is hinged a rounded cover 8. The back has formed integrally therewith an inwardly-sloping cross-wall 9, which coöperates with a hinged plate 10, having a downwardly-projecting portion 11, terminating in an inwardly-turned edge 12, and the fixed and hinged plates, in combination with the front and rear walls of the casing, form a hopper 13, into which the matches are introduced. The hinged plate has secured thereto a weight 14, which fills in the angle formed in the plate and serves to hold the plate in depressed position. Below the hopper is a feeding-cylinder 15, which extends from front to rear of the casing and is provided with a series of grooves 16, separated by ridges 17, the outer faces of which are given the general curvature of the cylinder. The terminal edge 12 of the hinged plate is positioned to normally abut against the surface of one of the ridges of the cylinder, which leaves the grooves between said edge and the companion edge of the sloping fixed plate free for the dropping thereinto of the matches inserted into the hopper. Behind the movable plate is an inwardly-sloping fixed plate 18, terminating in a semicircular wall 19, having a curvature corresponding to that of the cylinder, and the wall 19 is intended to prevent the discharge of the matches being carried down for delivery. The feed-cylinder is mounted on a shaft 20, and its ends are provided with peripheral flanges 21, leaving a raised portion at each end. The front and rear ends of the cylinder have formed integral therewith ratchet-wheels 22 and 23, respectively, provided with oppositely-disposed teeth, and the front ratchet 22 has coöperating therewith a dog 24, which lies within the raised portion in the end of the cylinder, and said dog has on its inner edge a tooth 25, which is held in engagement with the ratchet-wheel by means of a spring 26, which outwardly projects from the dog and abuts against the peripheral flange heretofore mentioned. The dog is pivoted, by means of a pivot 27, to an operating-lever 28, terminating at one end in a knife-blade 29 and at its other end in a handle 30, and the lever is adapted to travel within the slot 31 in the side wall 7 of the casing. The knife-blade 29 when the lever is raised, as shown in Fig. 2, occupies a position immediately below and in line with a cigar-aperture 33 in the front wall of the casing, the position of which aperture is indicated in dotted lines in Fig. 2, and this arrangement enables the end of a cigar to be inserted into the aperture and the lever thrown down at its operating end to raise the knife and shear off the end of a cigar prior to the discharge of a match. The ratchet-wheel 23 at the rear end of the feed-cylinder coöperates with a dog 34, provided with a tooth 35, held in engagement with the ratchet-wheel by means of a spring 36, which abuts against the peripheral flange 21 at the rear end of the cylinder. The operating-lever is provided with a depending arm 37, to which is attached a coil-spring 38, which connects with a stud 39, inwardly extending from the front wall of the casing, which arrangement holds the lever normally raised and in the position shown in Fig. 2 and allows it to be thrown down to raise its cutting end and simultaneously give the feed-cylinder a partial revolution sufficient to discharge a single match from that groove in the feed-cylinder which is brought beyond the terminal edge of the rounded guard-wall. For this purpose the number of teeth in the ratchet-wheel should correspond to the number of grooves in the feed-cylinder, so that the movements of the feed-cylinder will be properly adjusted to discharge but one match at a time.

Immediately beneath the terminal edge of the rounded guard-wall is a transversely-extending fixed plate 40, having on its inner face a series of fine teeth 41 for the purpose of scratching the matches thereon, and the fixed plate coöperates with a hinged plate 42, which is pivoted at its upper edge to an upright 43 on the bottom of the casing. The hinged plate or door is held normally retracted by means of a spring 44, but is adapted to have its lower or free end inwardly projected to abut against the roughened fixed plate 42 by means of an arm 45, which depends from the cutting end of the operating-lever.

The device as a whole may be mounted on legs or posts 46, and the front casing of the device may have imprinted or stamped thereon suitable advertising matter, such as the name of a brand of cigars or statements relating thereto.

In operation the matches are placed in the hopper with their heads toward the rear of the casing and the lever successively operated until the grooves on the guarded side in the feed-cylinder have been filled with matches, as shown in Fig. 2, after which the device is ready to operate. The end of a cigar may be then inserted into the aperture therefor and the operating-lever pulled down to its extreme position against the tension of the spring 38, which movement of the lever serves to retract the arm 45 on the lever and release the hinged door or plate 42, allowing it to be drawn back out of contact with the fixed plate 40 by the action of the spring 44. This opens the space between the plates and allows a match to fall between the plates and have its shank end outwardly project from the match-slot 4 in the concavity in the front of the casing. At the same time the movement of the lever raised the knife 29, shearing off the tip of the cigar simultaneously with the projection of the match. By releasing the operating-lever the spring 38 will draw the lever back to normal position, and the arm 43 will be again brought into abutment with the hinged plate or door and the greater tension of the spring 38 as compared with the spring 44 will allow the hinged plate or door to be moved toward its roughened companion plate, clamping or wedging the match-head between the two plates. As the match is withdrawn the match-head will be rubbed by the teeth 41 striking the match simultaneously with its withdrawal. It will thus be seen that the smoker is simultaneously provided with a lighted match and a clipped cigar at one and the same operation.

The manner herein shown of hinging one of the side walls of the hopper serves to prevent the matches from becoming clogged in the feed-cylinder and enables each match to find its place in one of the grooves or channels, since the hinged plate will be allowed to rise if the match tends to become wedged in any way, allowing the match to pass under the plate into the space behind, in which place it will remain until an open slot or channel in the feed-cylinder is brought into position for the match to fall thereinto. In view, however, of the fact that few matches will thus pass under the hinged plate the number of matches in the space indicated will never be large and the perfect operation of the feed mechanism will be assured at all times. By forming the terminal or abutting edge of the hinged plate to normally contact one of the ridges of the feed-cylinder none of the slots or grooves will be impeded, and the matches will be allowed to fall easily and naturally in place preparatory to their discharge. The lever, with its coöperating dog and ratchet, is intended to move the feed-cylinder the distance between adjoining slots or channels with every throw of the lever, and the dog and ratchet on the rear end of the feeding-cylinder serves to prevent the return of the cylinder as the lever is moved back by the tension of the spring.

What I claim as new, and desire to secure by Letters Patent, is—

1. In a device of the class described, a feed-cylinder provided with grooves for the reception of matches, a hopper in suitable proximity to the feed-cylinder and having one of its walls hinged and held by gravity in contact with the feeding-cylinder, a casing provided with a slot for the discharge of matches, a lever adapted to actuate the feeding-cylinder and provided on its end with a knife for simultaneously cutting a cigar and discharging a match, a fixed plate below the feeding-cylinder and in line with its point of discharge, a hinged plate adapted to clamp a match-head against the fixed plate, and an arm abutting against the hinged plate for normally holding the two plates in clamped position and allowing the hinged plate to be brought back out of clamped position for the reception of a match between the plates, substantially as described.

2. In a device of the class described, the combination of a casing provided with a slot for the discharge of matches, a fixed plate inwardly extending on one side of the slot, a movable plate inwardly extending on the other side of the slot, means for normally retracting the movable plate, a feeding mechanism adapted to successively discharge matches between the plates when in a retracted position, a lever adapted on its forward stroke to actuate the feeding mechanism to discharge a match between the plates, and provided with an arm adapted on its return stroke to abut against the movable plate and clamp the head of the discharged match between the plates preparatory to its withdrawal from the slot, substantially as described.

3. In a device of the class described, the combination of a casing provided in its front face with a concavity having therein a slot for the projection of a match-stem, a receptacle for matches within the casing, a cylinder extending from front to rear of the casing and provided with grooves for the reception of matches, a curved wall surrounding a portion of the cylinder and terminating at its lower end in line with the slot in the concavity for allowing the matches to fall into the groove and outwardly project from the casing, and plates inwardly extending from the slot, one of the plates being held under tension against the other plate for striking a match during its withdrawal from the slot, substantially as described.

4. In a device of the class described, the combination of a casing provided at its lower front edge with a concavity having therein a vertically-extending slot, a feeding-cylinder located above the slot and having its axis extending from front to rear of the casing, and provided with channels for the reception of matches, a pivotal mounting for the cylinder, a lever pivoted to the pivotal mounting and terminating at its inner end in a knife for clipping the ends of cigars, a ratchet and dog operated by the lever for moving the cylinder to successively discharge the matches deposited in the channels to allow the ends of the matches to outwardly project from the slot in the concavity, a fixed plate inwardly extending on one side of the slot, a movable plate inwardly extending on the other side of the slot, a spring for retracting the movable plate to allow for the deposit of a match, and an arm on the lever adapted to abut against the movable plate to compress the plates prior to the withdrawal of a match, substantially as described.

WILLIAM F. HERDRICH.

Witnesses:
   OSCAR W. BOND,
   WALKER BANNING.